US012276986B2

(12) United States Patent
Ram et al.

(10) Patent No.: US 12,276,986 B2
(45) Date of Patent: Apr. 15, 2025

(54) SELF-LOCALIZING SYSTEM OPERATIVE IN AN UNKNOWN ENVIRONMENT

(71) Applicant: INUITIVE LTD., Ra'anana (IL)

(72) Inventors: Idan Ram, Kfar Saba (IL); Ady Ecker, Ness Ziona (IL)

(73) Assignee: INUITIVE LTD., Ra'anana (IL)

( * ) Notice: Subject to any disclaimer, the term of this patent is extended or adjusted under 35 U.S.C. 154(b) by 299 days.

(21) Appl. No.: 17/845,145

(22) Filed: Jul. 6, 2022

(65) Prior Publication Data

US 2024/0012423 A1 Jan. 11, 2024

(51) Int. Cl.
*G05D 1/02* (2020.01)
*G05D 1/00* (2006.01)
*H04N 13/271* (2018.01)

(52) U.S. Cl.
CPC ......... *G05D 1/0238* (2013.01); *G05D 1/0094* (2013.01); *G05D 1/0276* (2013.01); *G05D 1/0287* (2013.01); *H04N 13/271* (2018.05)

(58) Field of Classification Search
CPC .. H04N 13/271; G05D 1/0238; G05D 1/0094; G05D 1/0276; G05D 1/0287; G05D 1/2446
See application file for complete search history.

(56) References Cited

U.S. PATENT DOCUMENTS

| 10,025,886 | B1 * | 7/2018 | Rublee | G01B 11/254 |
| 2016/0339587 | A1 * | 11/2016 | Rublee | B25J 13/089 |
| 2019/0178654 | A1 | 6/2019 | Archacki | |
| 2022/0214698 | A1 * | 7/2022 | Chopra | G05D 1/0293 |
| 2022/0371192 | A1 * | 11/2022 | Oyekanlu | B25J 9/161 |

OTHER PUBLICATIONS

K. Yousif et al., "3D SLAM in Texture-less Environments Using Rank Order Statistics" Robotica, Oct. 2015.

* cited by examiner

*Primary Examiner* — Yufeng Zhang
(74) *Attorney, Agent, or Firm* — Browdy and Neimark, PLLC

(57) ABSTRACT

A system configured to operate in an unknown, possibly texture-less environment, with possibly self-similar surfaces, and comprising a plurality of platforms configured to operate as mobile platforms, where each of these platforms comprises an optical depth sensor, and one platform operates as a static platform and comprising at least one optical projector. Upon operating the system, the static platform projects a pattern onto the environment, wherein each of the mobile platforms detects the pattern or a part thereof by its respective optical depth sensor while moving, and wherein information obtained by the optical depth sensors, is used to determine moving instructions for mobile platforms within that environment. Optionally, the system operates so that every time period another mobile platform from among the plurality of platforms, takes the role of operating as the static platform, while the preceding platform returns to operate as a mobile platform.

2 Claims, 3 Drawing Sheets

SELF-LOCALIZING SYSTEM OPERATIVE IN AN UNKNOWN ENVIRONMENT

TECHNICAL FIELD

The present disclosure generally relates to systems and methods using optical devices, and more particularly, it relates to a system comprising a plurality of mobile platforms moving in an unknown environment.

BACKGROUND

Imaging devices may be used to collect, process and store data from their environment in order to generate a digital representation of their environment. Capturing digital images of the environment, may be used to generate a 3-dimensional (3D) map, which in turn may be used to determine a path along which a mobile platform has moved.

For example, mounting an imaging device on a mobile platform such as a mobile robot which is in motion within an environment can facilitate the use of a digital 3D map to localize the mobile platform, by generating a 3D map of the mobile robot surroundings to determine the mobile robot's location within its environment.

US 20190178654 for example, describes a method for finding a location of a mobile platform in scenarios in which there are uncertainties concerning the coordinates of the map features.

Simultaneous localization and mapping (SLAM) techniques may be applied to video data, allowing a mobile robot to build a 3D map of an unknown environment while simultaneously keeping track of its current location and orientation in the environment. In general, SLAM techniques address the problem of using mobile platforms to construct a 3D map of an unknown environment while using the map to estimate the locations of the platforms within that environment and/or to navigate within the environment. Some SLAM techniques may use data from different types of sensors to localize the mobile platforms and map the features of the environment.

K. Yousif et al., in their article "3D SLAM in Texture-less Environments Using Rank Order Statistics" published in Robotica, October 2015, proposed a solution to a real time 3D Simultaneous Localization and Mapping ("SLAM") system for texture-less scenes using only depth information provided by a low cost RGB-D sensor. The proposed method is based on a sampling scheme that extracts points carrying the most useful 3D information for registration. The sampling technique samples a point cloud into a subset of points based on their 3D information.

However, techniques that are based on 3D registration of depth data, such as RGB-D cameras, cannot offer an adequate self-localization solution in an environment comprising of self-similar surfaces. A self-similar surface is defined as a surface that comprises identical or similar sub-parts at multiple sites, hence their alignment location cannot be determined. Examples of such self-similar surfaces include a planar surface, a sphere, a cylinder, or two intersecting planes (e.g. a wall and the floor). Such surfaces are commonly found in a man-made environment, particularly when the projector's range is short. In a case of a robot moving within an environment characterized as one with self-similar surfaces, the robot cannot navigate without relying on any static texture on the surface. Even in the case where a robot projects a pattern onto the surface, the pattern will move along with the robot, making it practically impossible to determine its location.

The present disclosure seeks to provide a solution to a localization problem of mobile platforms moving in an unknown, possibly texture-less environment, possibly with self-similar surfaces. The solution allows navigation in such an environment by using means that are mounted on each of the mobile platforms (such as optical means, or any other similar means)[1], and therefore move along together with their respective mobile platforms. In other words, the present invention seeks to provide a simple solution to the orientation problem of mobile platforms moving within an unknown, possibly texture-less environment, possibly with self-similar surfaces.

SUMMARY OF THE DISCLOSURE

The disclosure may be summarized by referring to the appended claims.

It is an object of the present disclosure to provide a system that comprises a plurality of mobile objects/platforms which are capable of moving around within an unknown, possibly texture-less environment, possibly with self-similar surfaces.

It is another object of the present disclosure to provide a system that enables a plurality of mobile objects/platforms to navigate within an unknown, possibly texture-less environment, possibly with self-similar surfaces, by relying on patterns projected onto that environment by at least one platform occasionally operating as a stationary platform.

It is another object of the present disclosure to provide a system that comprises a plurality of mobile objects/platforms, wherein one or more of these mobile platforms are selected to operate as stationary platforms that are configured to project one or more patterns to be used by the mobile platforms while determining their position and navigating in the unknown environment, possibly an environment with self-similar surfaces and/or texture-less regions.

Other objects of the present invention will become apparent from the following description.

According to an embodiment of the disclosure, there is provided a system configured to operate in an unknown environment and comprising a plurality of platforms configured to operate as mobile platforms, where each of these platforms comprises an optical depth sensor, and at least one platform is configured to operate as a static platform and comprises at least one optical projector, wherein upon operating that system in an unknown environment, the at least one static platform is configured to project a pattern onto the unknown environment, wherein each of the plurality of mobile platforms is configured to detect the pattern or a part thereof by its respective optical depth sensor while moving, and wherein information obtained by the optical depth sensors, is received by at least one processor and used to determine moving instructions (e.g., moving direction) for at least one respective mobile platform within the unknown environment.

The term "unknown environment" as used herein throughout the specification and claims should be understood to encompass all of the following various environments in which the mobile platforms need to navigate: an environment of which there is no prior knowledge as to what is comprised in that environment, a texture-less environment, a partially texture-less environment, an environment having one or more self-similar surfaces, and any combination of these environments.

The term "platform" as used herein throughout the specification and claims should be understood to encompass any object that is provided with moving capabilities and is adapted to move independently within an unknown environment, such as a robot which may move using its own legs, like a humanoid, a robot that may roll on wheels, or any other form that is known in the art per se, a drone, or the like.

According to the present invention, upon operating the system in an unknown environment, the at least one static platform is configured to project a pattern onto the unknown environment. It should be noted that one optional operational mode is that the plurality of platforms are operative as soon as they are introduced into their operational environment, irrespective of the fact whether their whole operational environment is a known or an unknown environment. By an alternative option, the platforms are introduced into their operational environment in a non-operational mode and only when a mobile platform cannot identify its location within the unknown environment (e.g., upon detecting that it faces a white wall), it will communicate with the rest of the mobile platforms, indicating to them that they should resume their operational mode, whereby one of the platforms will assume the role of a static platform, while at least some of the other platforms assume the operational mode of the mobile platforms. It should be understood, that both these options are covered by the present invention.

According to an embodiment of the disclosure, the at least one static platform is configured to project the pattern on a floor, or on a ceiling or on a wall, or on any combination thereof, of the unknown environment (e.g., a wall of a warehouse).

In accordance with another embodiment of the disclosure, at least one of the plurality of platforms is a robot or a drone.

According to still another embodiment of the present disclosure, the at least one static platform is a mobile platform which is selected to operate as a static platform.

By yet another embodiment of the disclosure, each of the at least one processor is configured to operate at a respective mobile platform.

According to still another embodiment of the disclosure, each of the mobile platforms further comprises a transceiver configured to forward information received from its respective optical depth sensor to a central unit and receive from the central unit, moving instructions, enabling the respective mobile platform to move within that unknown environment. It should be noted that the central unit may be located either within the unknown environment or outside that environment but within a distance that will still enable exchange of communications between the central unit and the various platforms while using the wireless transmission method implemented by the system (e.g., cellular, Wi-Fi, Bluetooth and the like). Both these options should be understood as being encompassed by the present invention.

By yet another embodiment the optical sensor mounted on at least one of the mobile platforms is a stereo camera.

According to still another embodiment the optical sensor mounted on at least one of the mobile platforms is a single camera using mono-SLAM (i.e., detecting a 3D trajectory by a monocular camera, moving through a previously unknown scene). Optionally, in that embodiment an addition sensor may be used in order to prevent scale-drift of the acquired image (e.g., an inertial measurement unit ("IMU"))

According to another embodiment of the disclosure, the central unit comprises at least one processor configured to process the information received from the optical depth sensors of the mobile platforms, process the received information and determine moving instructions for each of these mobile platforms.

By yet another embodiment of the disclosure, the optical depth sensor of at least one of the mobile platforms is a pair of stereoscopic cameras.

According to still another embodiment of the disclosure, the at least one platform configured to operate as a static platform, comprises at least two optical projectors and wherein each of the at least two optical projectors is configured to project the same or a different pattern than the other projectors within the unknown environment.

According to another embodiment of the disclosure, each mobile platform comprises a single projector and at least one optical depth sensor (e.g., being a stereo camera) or a mono camera.

By still another embodiment, the system comprising a plurality of mobile platforms each comprising a projector and wherein the system further comprises at least one mobile unit comprising at least one optical depth sensor (e.g., being a stereo camera) or a mono camera. Optionally, the at least one mobile unit which comprises the at least one optical depth sensor, is further configured to communicate with the plurality of mobile platforms that comprise a projector, and provide each of the latter mobile platforms with respective moving instructions.

In accordance with yet another embodiment of the disclosure, each of the mobile platforms comprises a transceiver configured to enable exchange of communications between the mobile platforms themselves.

By still another embodiment of the disclosure, the communications exchanged between the mobile platforms themselves comprise information that allow a processor associated with a mobile platform receiving such communication(s) to generate moving instructions for itself, thereby enabling that receiving mobile platform to move within the unknown environment.

According to another embodiment of the disclosure, the system comprises at least two mobile units which are mechanically linked to each other, where at a given time at least one of the at least two mobile unit acts as a static platform whereas at least one of the other at least two mobile units acting as a mobile platform, is configured to change its position with respect to the mobile unit acting as the static platform.

Let us take for example a robot being the platform, having two legs, each comprising a projector mounted thereon. This example refers to a case that both parts are mechanically linked and have a single processor ("brain") controlling their operation. In this example, one leg of the robot remains static and its associated projector is used for projecting the pattern on the environment, while the second leg of the robot moves with its projector turned off. A single stereo camera used in this example is configured to capture images of the projected pattern, e.g., being a single stereo camera that is mounted at the head of the robot. At a later stage, the role of the legs is changed. The previously moving leg becomes a static one, its projector is turned on and starts projecting the pattern, whereas the previously static leg, becomes a moving platform. Such a robot may be a humanoid, i.e., a robot that has legs that can move like a human, or a robot with more than two legs, or a robot that rolls on wheels.

By still another embodiment, the at least one processor is further configured to generate a 3D map of said unknown environment while using information received from the plurality of mobile platforms following detection of the projected pattern or of a part thereof.

According to another aspect of the present disclosure there is provided a system configured to operate in an unknown environment and comprising a plurality of platforms configured to operate as mobile platforms, wherein each of the plurality of mobile platforms comprises at least one optical depth sensor and at least one optical projector, wherein upon operating the system in an unknown environment, a first platform is selected from among the plurality of mobile platforms to operate as a static platform, and to project a pattern onto the unknown environment, wherein each of the remaining mobile platforms is configured to detect the pattern or a part thereof by its respective optical depth sensor, wherein information obtained by the optical depth sensors, is received by at least one processor and used to determine moving instructions for at least one mobile platform within the unknown environment, and wherein the system is further adapted to select a second platform from among the plurality of mobile platforms to operate as a static platform and to project a pattern onto the unknown environment, and to change the mode of operation of the first platform from operating as a static platform, to a platform operating as a mobile platform.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein or recited in the claims.

In the following description, for the purposes of explanation, numerous specific details are set forth in order to provide a better understanding of the present invention by way of examples. It should be apparent, however, that the present invention may be practiced without these specific details.

Figure 1:
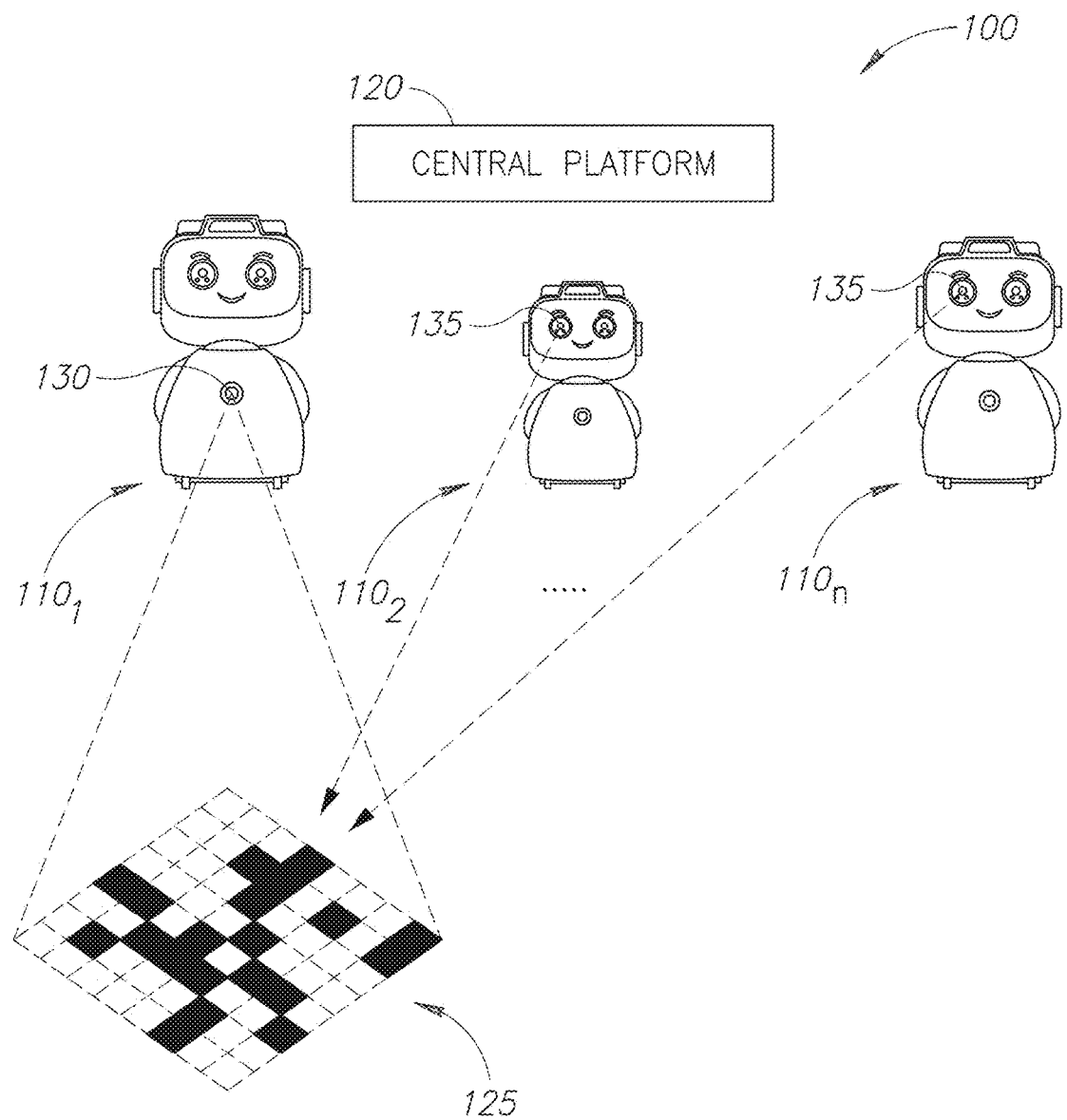
FIG. 1—illustrates a schematic presentation of a system construed in accordance with an embodiment of the present invention.

FIG. 1 illustrates a schematic presentation of a system 100 construed in accordance with an embodiment of the present invention. System 100 illustrated in this figure comprises at each point in time, a stationary robot $110_1$ comprising a projector 130 and a plurality of mobile robots $110_2, \ldots, 110_n$ (mobile platforms), each comprising depth cameras 135 operating as optical depth sensors, wherein the plurality of mobile robots $110_2, \ldots, 110_n$ are set to operate in this example for the first time within a confined texture-less space such as a warehouse (not shown in this figure), a space that has not yet been mapped. The projector of robot $110_1$ projects a pattern 125 by projector 130 onto the wall of the warehouse, and each of mobile robots $110_2, \ldots, 110_n$ uses its capturing image sensor 135 (e.g., stereo cameras) to detect the target that comprises pattern 125 or a part thereof, and to capture its image as seen from the current spot at which each respective mobile robot is located.

One embodiment of carrying out the present invention is that each of the mobile robots $110_2, \ldots, 110_n$ has its own processor which is adapted to receive data associated with the capture image of pattern 125, analyze it and determine, based on that analysis, the relative position of the respective mobile robot with respect to the 3D map points derived from the target pattern 125. Once the relative position of the respective mobile robot has been established, the processor issues moving instructions for that mobile robot to enable the latter to move within the warehouse.

Figure 2:
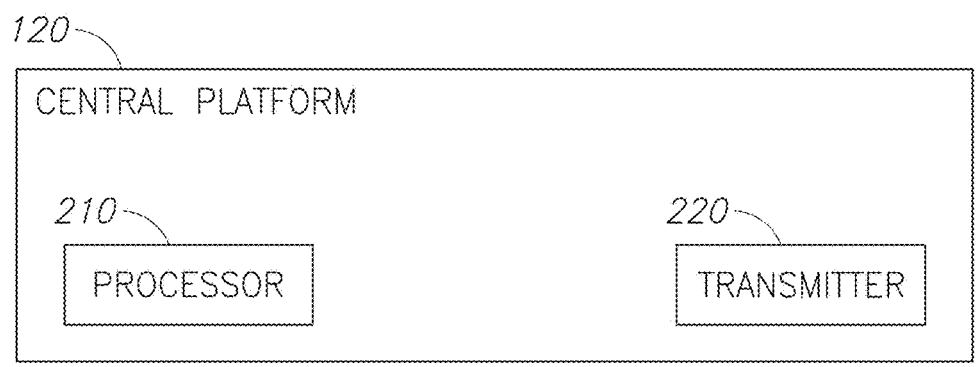
FIG. 2—illustrates a schematic presentation of an embodiment of a central platform comprised in the system depicted in FIG. 1.

FIGS. 1 and 2 further illustrate another embodiment of carrying out the present invention. System 100 depicted in FIG. 1 further comprises a central platform (a.k.a. a central unit) 120 that is configured to receive information associated with pattern 125 as captured by each of the mobile robots $110_2, \ldots, 110_n$, wherein the information is forwarded to central platform 120 by transmitters, each associated with a respective mobile robot. A more detailed schematic view of an example of central platform 120 is illustrated in FIG. 2.

Optionally, one or more of the mobile robots $110_2, \ldots, 110_n$ forwards to the central platform two or more captured images of the target pattern. In such a case after forwarding the first captured image of the target pattern to the central platform, the respective mobile robot changes its location. This location change may be either a predetermined change (for example moving 30 cm to the left) after which a further image of the target pattern is captured, or central platform 120 instructs that specific mobile robot how to change its location.

Based on the information retrieved from the different captured images of mobile robots $110_2, \ldots, 110_n$, processor 210 analyze the data retrieved from the captured patterns, and determines based on that analysis, the relative position of each of the mobile robots with respect to the 3D map points derived from the target pattern 125. For example, based on the pattern images captured by each of the mobile robots, the processor is able to determine the distance of a respective mobile robot from the target pattern and its orientation (e.g., the angle which the mobile robot is located with respect to a normal extending from the target pattern). Once the relative position of a mobile robot has been established with respect to the 3D map points derived from the target pattern, processor 210 issues moving instructions for that mobile robot within the warehouse and transmit the instructions by transmitter 220 to the respective mobile robot. A similar process is carried out for each of the other mobile robots.

Optionally, the process by which each of the mobile robots sends captured images of pattern 125 to central platform 120 and receives from central platform 120 updated moving instructions, is carried out every pre-defined period of time (e.g., every second). In the alternative, once central platform 120 informs a mobile robot of its initial position relative to the 3D map points derived from the target pattern, a processor comprised in that mobile robot calculates a path along which that mobile robot will be able to move within the unknown environment. Optionally, information related to the various paths calculated by the respective mobile robots' processors is forwarded to the central platform for the latter to confirm that none of the paths might cause collisions between mobile robots.

Typically, for real-time navigation, the mobile robot usually estimates its position at each point in time. Yet, a path in the unknown environment can be estimated at a higher accuracy by implementing a post-processing procedure while applying any applicable filtering method that is known in the art per se.

Still, in order to avoid interferences between the mobile robots communicating with the central platform, according to the present example, time slots are allocated to the various mobile robots, wherein during such a time slot at least one but less than all of the mobile robots, are allowed to communicate with the central platform. Yet, it should be understood, that there are quite a few communication protocols that are known in the art per se that can be used for this purpose such as time-division multiplexing, frequency-division multiplexing and the like. As will be appreciated by those skilled in the art, the present invention is not limited to any such specific communication protocol.

FIGS. 3A to 3D exemplify various scenarios while carrying out an embodiment construed in accordance with the present invention. The underlying idea which is the basis of this example is, that when the system is operative, a first robot projects a pattern while acting as a static robot, and all other robots, being the mobile robots, move based on information derived from capturing an image of that pattern (or part thereof). Then, a second robot assumes the role of acting as a static robot, while the other robots (including the first robot that was previously the static robot) move based on information derived from capturing an image of the pattern (or part thereof) projected by the second robot. The robots may proceed within the unknown environment when each time another robot assumes the role of the static robot for a certain period, while the other robots move around, and then replaced by another robot that becomes the static one. Obviously, the replacing robot may be the first robot replacing the second robot while assuming the role of the static robot, or it can be a third robot (i.e., any robot selected from among the other robots) that assumes the role of the static robot.

Figure 3A:
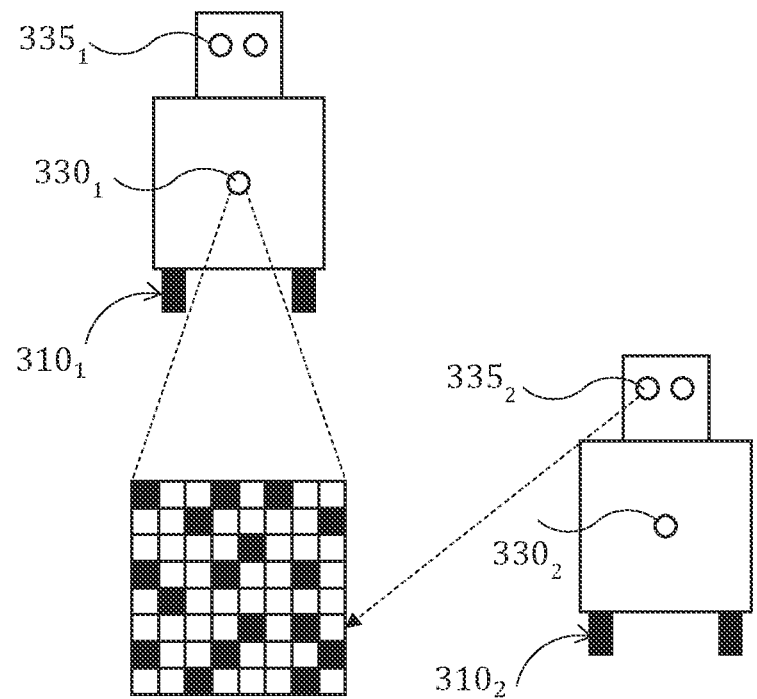
FIGS. 3A to 3D—exemplify various scenarios while carrying out an embodiment construed in accordance with the present invention.
Figure 3B:
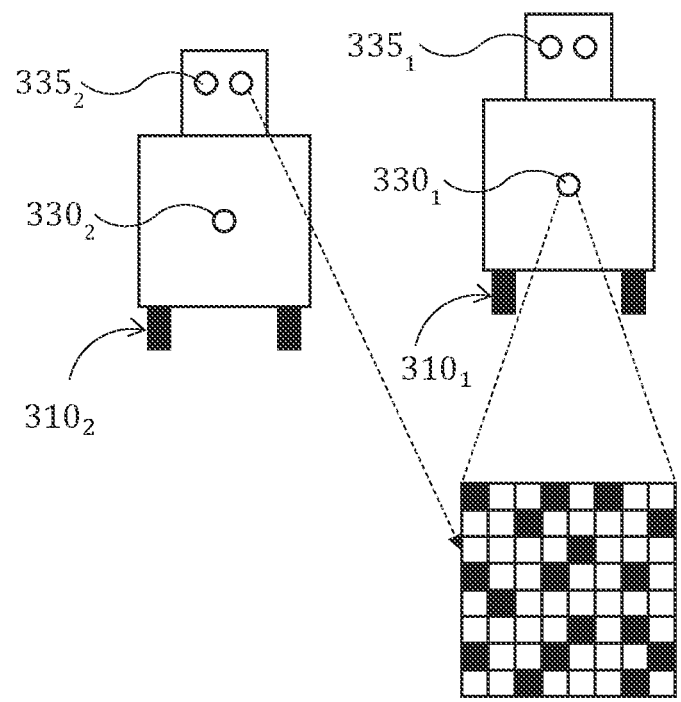
Figure 3C:
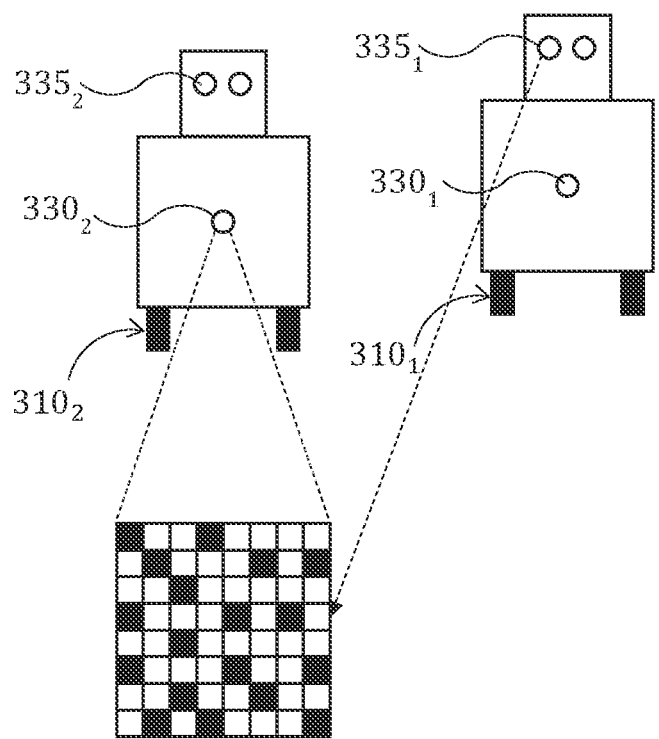
Figure 3D:
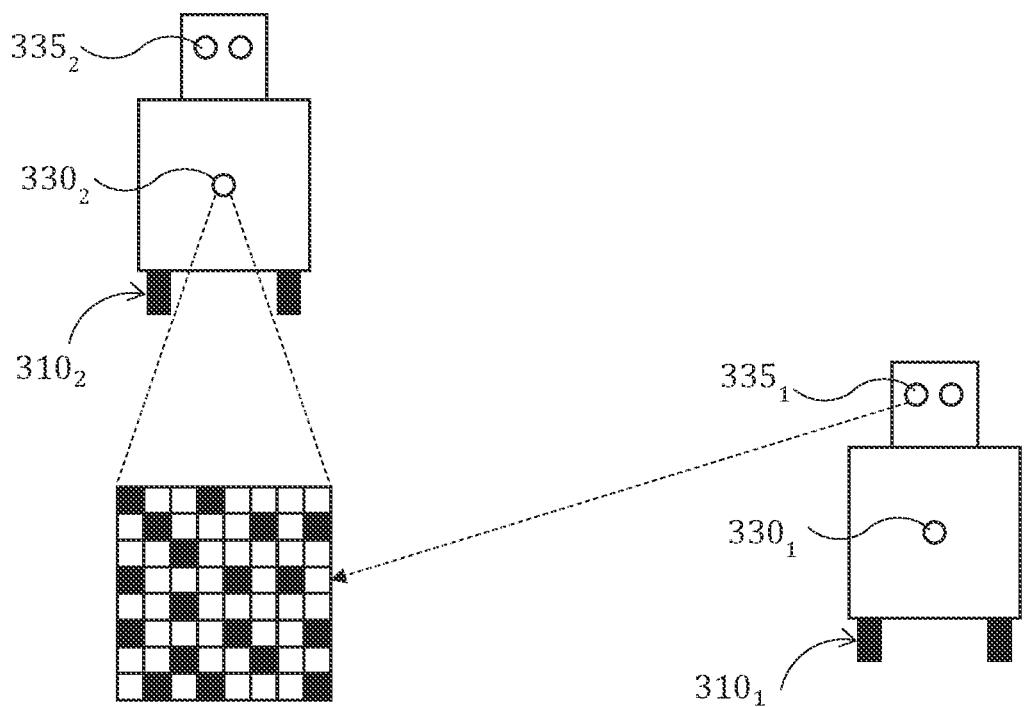

In the current example, two robots are demonstrated. Robots $310_1$ and $310_2$, each comprising a projector $330_1$ and $330_2$, respectively and a 3D camera $335_1$ and $335_2$, respectively. The first scenario (say, at $t=t_0$) is illustrated in FIG. 3A, by which robot $310_1$ projects a pattern at the unknown environment, and by using 3D camera $335_2$, robot $310_2$ captures an image of that pattern, and forwards the captured image to a memory or to a processor. Next FIG. 3B, demonstrates that after some time (say at $t=t_1$), robot $310_2$ moves to another location, while robot $310_1$ remains stationary during that period that extends between $t_0$ and $t_1$. At $t_1$, robot $310_2$, that is now located at another location, captures a second image of the pattern by its 3D camera $335_2$, which is then processed together with the first image previously taken by robot $310_2$ and the results derived from the processing of the images, enable localization of robot $310_2$ within that environment. After some time (say at $t=t_2$) as depicted in FIG. 3C, robot $310_2$ becomes the now stationary robot, and starts projecting a pattern by its projector $330_2$. Robot $310_1$ turns off its projector and uses its 3D camera to capture the image of the image projected by robot $310_2$. After some time (say at $t=t_3$) as depicted in FIG. 3D, robot $310_1$ moves to another location and uses its 3D camera, $335_1$, to capture the pattern projected by robot $310_2$ from its new location, thereby enabling determining the current location of robot $310_1$. As will be appreciated by those skilled in the art, by changing the robots' functionalities (mobile/stationary) the various robots assist each other to navigate within the unknown environment, while eliminating the need to use a dedicated stationary platform for carrying out the solution of the present invention.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different objects, not all of which are required in all embodiments of the invention. Some embodiments of the present invention utilize only some of the objects or possible combinations of the objects. Variations of embodiments of the present invention that are described and embodiments of the present invention comprising different combinations of features noted in the described embodiments will occur to persons of the art. The scope of the invention is limited only by the following claims.

The invention claimed is:

1. A system configured to operate in an unknown environment and comprising a plurality of platforms configured to operate as mobile platforms, where each of said plurality of mobile platforms comprises an optical depth sensor, and one or more different platforms are configured to operate as static platforms, each comprising at least one optical projector, wherein upon operating said system in an unknown environment, the at least one static platform is configured to project a pattern within the unknown environment, wherein each of the plurality of mobile platforms is configured to detect said pattern or a part thereof by its respective optical depth sensor, and wherein information obtained by said optical depth sensors, is received by at least one processor and used to determine moving instructions for at least one mobile platform within the unknown environment, wherein the system comprises at least two mobile units which are mechanically linked to each other, and wherein at a given time, at least one of the at least two mobile units acts as a static platform and wherein at least one of the other at least two mobile units is configured to change its position with respect to the mobile unit acting as the static platform.

2. A system configured to operate in an unknown environment and comprising a plurality of platforms configured to operate as mobile platforms, wherein each of said plurality of mobile platforms comprises at least one optical depth sensor and at least one optical projector, wherein upon operating said system in an unknown environment, a first platform is selected from among the plurality of mobile platforms to operate as a static platform, and to project a pattern within the unknown environment, wherein each of the remaining mobile platforms is configured to detect said pattern or a part thereof by its respective optical depth sensor, wherein information obtained by said optical depth sensors, is received by at least one processor and used to determine moving instructions for at least one mobile platform within the unknown environment, and wherein said system is further adapted to select a second platform from among the plurality of mobile platforms to operate as a static platform and to project a pattern within the unknown environment, and to change mode of operation of said first platform from operating as a static platform, to a platform operating as a mobile platform.

\* \* \* \* \*